3,524,132
GALVANOMETER HAVING A WIDE REFLECTIVE MIRROR WITH LOW INERTIA

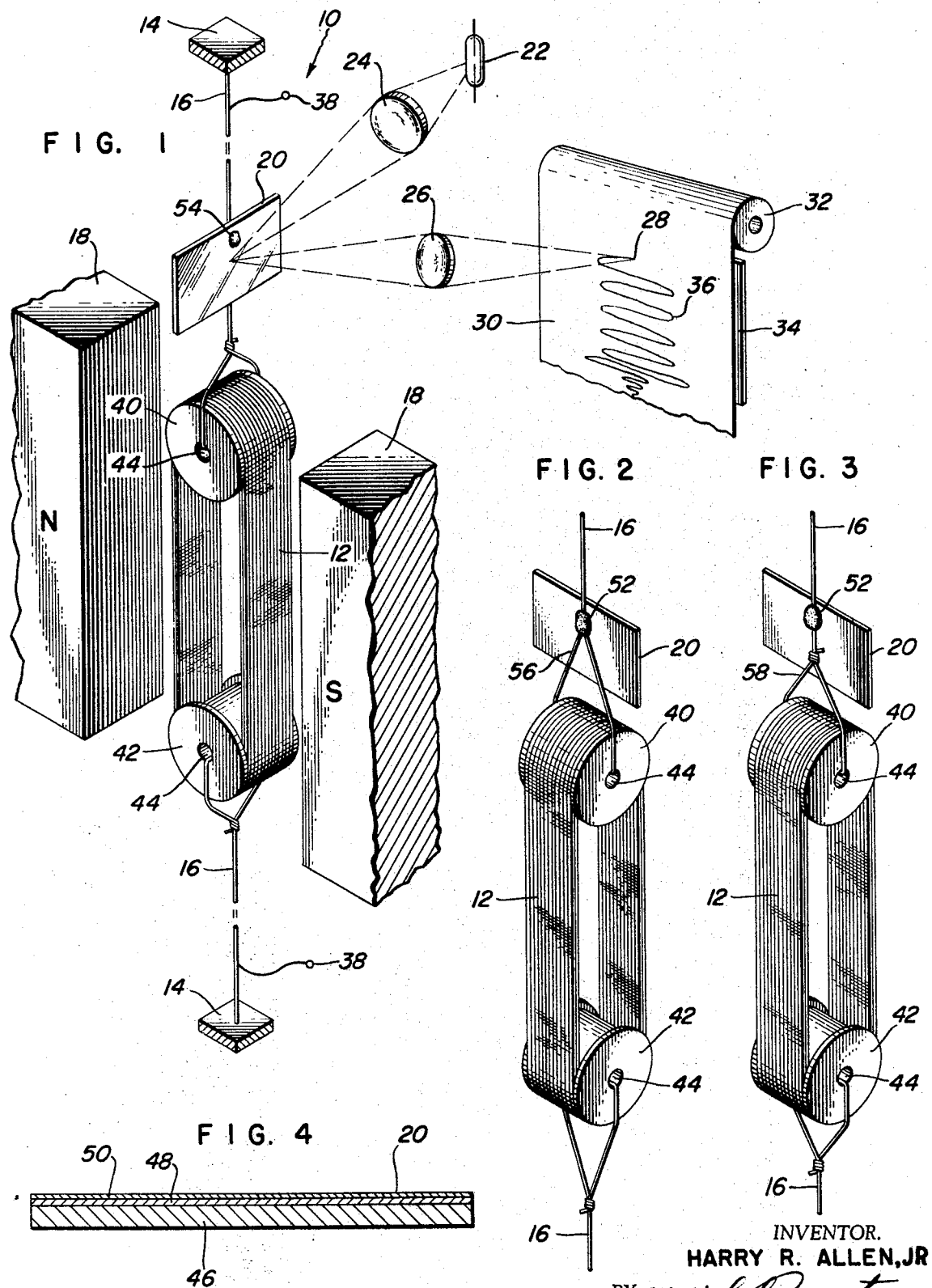

Harry R. Allen, Jr., Littleton, Colo., assignor to Honeywell Inc., Minneapolis, Minn., a corporation of Delaware
Filed July 6, 1967, Ser. No. 651,446
Int. Cl. G01r 13/38
U.S. Cl. 324—97                  12 Claims

ABSTRACT OF THE DISCLOSURE

A galvanometer is shown having a mirror attached to a suspension system which reflects a beam of light from a light source for providing an indication of an input signal applied thereto. The mirror is constructed from a silicon chip which has been lapped to a required flatness, etched to the desired thickness, and cut to its final area dimensions to provide a wide mirror having a low inertia.

---

The present invention relates to a galvanometer having a reflective means and a method for manufacturing said reflective means; and, more particularly, the present invention relates to a galvanometer having a reflective mirror which has a high stiffness, large reflecting surface to mass ratio, and has been substantially reduced in thickness for decreasing its inertia for thereby improving the performance of the galvanometer.

The utilization of a galvanometer for providing an indication of an input signal by reflecting a beam of light is well known in the art. A record of the input signal may be provided by directing the reflected light beam toward a radiation sensitive recording medium and focusing it in the form of a recording spot thereon. The present invention provides a unique arrangement for reducing the size of the recording spot and improve the resolution of the recording trace thus formed. The width of the recording spot which forms the recording trace is simply the image of the lamp arc width that forms the light source, as it is focused by the optical system associated with the galvanometer mirror, upon the recording medium. Various factors contribute to the width of the recording spot, for example: the lamp arc width, the galvanometer optical system magnification ratio, the galvanometer mirror diffraction, optical scattering and reflection, imperfections in the optical system elements, and accuracy of focus of the galvanometer optics. It has been determined that the first three factors dominate the problem. The width of the recording spot $w$ is determined by the physical arrangement of the optical system of the galvanometer including the distance from the light source to the galvanometer $L'$, the distance from the galvanometer to the recording medium $L$, and the width of the light source itself $w'$. Thus, the recording spot width may be expressed as:

$$w = \frac{L'}{L} w'$$

This straight forward equation shows that the width of the recording spot may be decreased by increasing the distance L between the recording medium and the galvanometer. If the light source is made smaller, or apparently smaller, provisions must be made for decreasing the diffraction of the galvanometer optical system and, thus, increasing the amount of radiation reflected toward the radiation sensitive recording surface. Prior art galvanometer have utilized a relatively narrow mirror width for retaining the moment of inertia of the mirror within usable boundaries. If the width of the recording spot is to be reduced, the width of the galavnometer mirror must be increased for increasing the intensity of the recording spot. This may be achieved by providing a larger surface area for reflecting the radiation from the light source while reducing the inertia of that surface area.

Accordingly, it is an object of the present invention to provide a unique oscillographic galvanometer capable of reflecting a narrowly focused beam of radiation as an indication of an input signal applied thereto.

Another object of the present invention is to provide a galvanometer with means for reducing the width of a recording spot formed by the reflection of a beam of radiation from the galvanometer.

Still another object of the invention is to provide a galvanometer with a mirror which is wide enough to reflect a majority of a light beam focused thereon for reducing the amount of radiation loss due to the diffraction thereof.

A further object of the invention presented herein is to provide a galvanometer with a flat mirror having a high stiffness that is substantially reduced in thickness while having a high reflective surface to mass ratio.

A still further object of the present invention is to provide a stiff, thin galvanometer mirror that is flat enough for utilization within an oscillographic galvanometer and which is capable of retaining its flatness over a prolonged period of time.

Other objects and many of the attendant advantages of the present invention will become readily apparent to those skilled in the art, as a better understanding thereof is obtained by reference to the following detailed description when considered in connection with the accompanying drawings, wherein:

FIG. 1 is a schematic representation of a suspension system utilized within a galvanometer incorporating the present invention;

FIG. 2 is a schematic representation, showing a method of mounting a stiff, thin galvanometer mirror of the present invention;

FIG. 3 is a schematic representation showing a second method of mounting a stiff, thin galvanometer mirror; and FIG. 4 is a cross-sectional view of the galvanometer mirror taken along the longitudinal axis thereof.

It has been determined through computation and experimentation that the width of the recording spot produced by a galvanometer can be decreased by a factor of two by optical minification to produce a narrower source image and by doubling the width of the galvanometer mirror to minimize diffraction. However, doubling the width of the mirror increases the moment of inertia thereof by a factor of 8. In many prior art galvanometers, the ratio between the height to width is of the order of 7:1; and, therefore, the height can easily be reduced by half to limit the inertia increase to a factor of 4. For high frequency galvanometers, moment of the inertia of the galvanometer mirror forms a significant percentage of the total inertia of the suspension system. When the moment of inertia of the mirror is increased by a factor of 4, the mirror creates an unacceptable degradation of the frequency response of the galvanometer. Thus, a wider galvanometer mirror is required to reduce the width of the recording spot formed thereby, but the inertia thereof must also be reduced to prevent the reduction of the natural frequency of the galvanometer.

When dealing with the oscillatory motion of the galvanometer mirror, the moment of inertia is the sum of the masses of infinitely small particles of the mirror times the square of their respective distances from the axis of rotation. As it is desirable to provide a mirror with a large reflective surface, it can be seen that the ratio of the reflective surface to mass or the ratio of the reflective surface to inertia becomes a significant indication of a desirable mirror arrangement. For example, a typical prior art galvanometer mirror has a reflective surface to mass ratio of $9 \times 10^4$ in 2/poundal, while the galvanometer mirror produced by the present inverter has a reflective surface to mass ratio of $37 \times 10^4$ in 2/poundal. Mass is a function of the density of an object times its volume. Therefore, to reduce the mass and moment of inertia of the mirror within the galvanometer, it is necessary to reduce either density, height, width or thickness thereof. As indicated herein, it is desired to widen the mirror. The height of the mirror has been reduced as far as is practical. The density of the prior art glass mirrors could be reduced; but other possible materials, such as aluminum foil, have approximately the same density. Therefore, the only dimension of the mirror which can be reduced further is its thickness.

Prior art galvanometer mirrors have a thickness of approximately .004 inch and are generally constructed from glass. When the mirror width is doubled, it is necessary to reduce the moment of inertia by a factor of 8. This is accomplished by reducing the height of the galvanometer mirror by a factor of 2 and reduce the thickness by a factor of 4. Thus, the galvanometer mirror of the present invention has a required thickness .001 inch or less. It is possible to form metal foils or material, such as aluminum and beryllium to a thickness of .001 inch. However, the flatness of the metal foil thus formed can not be retained within the required limits necessary for a galvanometer mirror. It has been determined that the galvanometer mirror must have a flatness of better than 10 microinches across its full width. The utilization of glass, which is generally used in prior art galvanometer mirrors, is unacceptable as it is too fragile when produced in .001 inch thicknesses.

It has been found that materials having a crystal lattice in the form of a cubic diamond are especially suitable for producing a thin, stiff galvanometer mirror. In the preferred embodiment of the present invention the material utilized is silicon; however, other brittle materials having a high stiffness and the ability to resist deformation even when oscillated at a high frequency may be used, such as germanium. It should be noted that silicon has a density substantially equal to the density of glass. Therefore, it may be utilized interchangeably without affecting the moment of inertia of the galvanometer mirror.

Referring now to the drawings, FIG. 1 illustrates a galvanometer shown generally at 10 having a galvanometer coil 12 supported from a main frame 14 by suitable suspension filaments 16. The galvanometer suspension system retains the coil 12 suspended with a magnetic field which may be formed by a pair of permanent magnetic pole pieces 18. A mirror 20 is attached to the upper suspension filament 16, as by bonding with an epoxy resin. A source of ultraviolet light 22 is focused through a first lens 24 onto the mirror 20 and reflected therefrom through a second lens 26 where it is focused into a recording spot 28 upon the radiation sensitive surface of a recording medium 30. The recording medium 30 is stored upon a reel 32 and arranged to be drawn over a platen 34 where a recording trace 36 is formed thereon. An input signal current is applied to the galvanometer coil 12 through input terminals 38 which attach to the outer most portions of the suspension filaments 16. The input signal creates a flux within the coil which tends to align itself with the flux of the magnetic field for deflecting the coil and providing an indication of that input signal. The galvanometer coil is constructed from a wire wrapped about upper and lower coil supporting spools 40 and 42, respectively. Each spool is provided with an aperture 44 passing through the longitudinal axis thereof. Each suspension filament 16 is threaded through a spool aperture, looped back upon itself, and then wrapped about itself for completing the assembly of the galvanometer suspension system.

The mirror 20 must be constructed in such a way that the desired flatness and thickness may be easily obtained. Further, the material which is utilized for constructing the mirror must be suitably chosen to allow a thin and stiff mirror to be formed, and retain that form, without warping due to manufacturing stresses within the material. In the preferred embodiment, the mirror is constructed from a stiff, brittle material 46, FIG. 4, having a crystal lattice of the cubic diamond form which is characterized in its ability to resist deformation. This material must be easily polished to form its own mirror and easily etched for allowing the proper thickness to be achieved without establishing stresses therein. In the preferred embodiment silicon has been utilized with much success. However, other materials, such as germanium, have been utilized with success. It has been found that the silicon or germanium chip, from which the mirror 20 is manufactured, need not be in the purest form. For example, one source for the silicon chip has been the utilization of rejected silicon chips which did not meet the electrical semiconductor standards they were designed and manufactured to meet.

In manufacturing the mirror 20 the silicon chips are first ground, lapped and polished to the desired flatness of better than 10 microinches across the width of the reflective surface thus formed. The reflective surface is then masked by a suitable resistive material, such as wax or a photoresist. The masked chip is then placed in an acid etching bath long enough to obtain the desired thickness. The acid bath consists of a solution of 4 percent hydrofluoric acid, 48 percent normal, concentrated sulfuric acid, and acetic acid as a dilutent. The bath is retained at room temperature. After removal from the etching bath, the wafer thus formed is cut, by scribing a line with a diamond point and breaking the chip along that line, to the desired width and height. In the preferred embodiment the desired dimensions are .030 inch wide by .050 inch high. The result of this method of manufacture is a silicon chip, .001 inch thick, which is flat and retains its flatness due to the absence of residual stresses normally found in materials which have been machined. The high stiffness and brittleness of the silicon enable it to maintain its flatness or fracture rather than warping as a metalic material normally would. In practice, the silicon chips produced by this method obtains a flatness of better than 3 microinches and retains this flatness without deformation during subsequent utilization within an oscillating galvanometer.

Many prior art galvanometer, as indicated hereinabove utilized a relative narrow mirror, as for example, .015 inch wide by .100 inch high and .004 inch thick. As also noted hereinabove, the width of the mirror has been increased in the present invention to provide for the reflection of a greater percentage of radiation which forms the beam of light and reduce the diffraction thereof. It will be obvious to those skilled in the art, that an ideal mirror for this purpose would be in the shape of a square or circle. This arrangement maximizes the usable reflective surface of the mirror while minimizing the moment of inertia thereof. By calculation, it can be determined that a mirror having the same density, thickness and moment of inertia as the mirror described herein would have a side dimension of .034 inch, if square, or a diameter of .036 inch, if a circle. The mirror utilized by the present invention is .030 inch wide by .050 inch high as this arrangement lends itself to fabrication and assembly. However, the dimensions indicated herein and other dimensions and shapes may be utilized without departing from the scope of the present invention.

An alternate method for forming the desired width and height of the silicon chip is to remove the chip from the etching bath after it obtains the correct thickness, and masked the newly etched surface to the desired height and width. The chip is then returned to the bath and the excess silicon removed. This method insures that no residual stresses are formed within the silicon chip even during the cutting and sizing process. If it is desired to increase the reflectivity of the lapped surface, the surface may be coated with a very thin layer of aluminum 48, FIG. 4. The aluminum may be applied by the vacuum evaporation process which is well known in the art. In order to protect the aluminum reflective surface, a second layer of silicon monoxide 50 is vacuum deposited over the aluminum thus preventing oxidation and providing a mechanical protection therefore. When the mirror 20 is bonded to the upper suspension filament of the fibratory assembly, a small dot of an epoxy resin 52 is placed on the etched surface thereof. The silicon mirror is then placed in contacting relation with the upper suspension filament 16 and the epoxy resin allowed to harden. It has been found that this procedure establishes small amounts of stress within the silicon mirror as the epoxy resin hardens. This may be prevented by applying an equal dot of an epoxy resin 54 upon the reflective surface of the mirror 20 opposite the dot which has been previously placed on the etched surface thereof. As the epoxy resin dot 52 dries and bonds the mirror against the suspension filament, the second epoxy resin dot 54, on the reflective surface of the mirror, also dries for counteracting the stresses established by the drying epoxy resin. The epoxy resin dot 54 on the reflective surface of the mirror 20 is small enough that it does not interfere with the reflectivity of the mirror surface.

The mounting arrangement shown in FIG. 1 is generally used within a fluid damped galvanometer. Prior art galvanometer mirrors have often been mounted by forming the upper suspension filament into a bifurcated portion at the spool end thereof. The mirror is then placed between the symmetrical arms of the bifurcated portion. Within the present invention, the silicon mirror 20 does not have sufficient strength under compression to withstand insertion between the suspension filament. Therefore, the suspension filament is formed into a V-shaped arrangement 56 and the silicon mirror is positioned on the plane formed by the edges thereof, as shown in FIG. 2. This type of arrangement is utilized within an electro-damped galvanometer. However, if it is desirable to reduce the moment of inertia of the suspension system, a very short V-shaped arrangement 58, as indicated in FIG. 3, may be utilized.

Accordingly there has been provided a galvanometer mirror constructed from a silicon chip which is twice as wide and half as high as the prior art mirrors. To insure that the mirror does not increase the moment of inertia of a suspension system within a galvanometer, there has ben provided a means for reducing the thickness thereof by a factor of 4 or more. Thus, a galvanometer has been provided with a means for decreasing the width of the recording spot without causing a degradation of the performance thereof.

Obviously, many modifications and variations of the present invention will become apparent to those skilled in the art in light of the above teachings; and it should therefore be understood that the embodiments described herein are illustrations rather than limitations of the scope of the present invention. Consequently, the present invention should be limited only by the appended claims.

The embodiments of the invention in which an exclusive property or privilege is claimed are defined as follows:

I claim:

1. A galvanometer for providing an indication of an input signal in the form of a reflected light beam, comprising, means for receiving said input signal, suspension means supporting said means for receiving said input signal, flat reflective means having a substantially equal width and height attached to said suspension means for reflecting said light beam, said reflective means constructed from the crystal material of an element having a crystal lattice of the cubic diamond form for providing a large reflecting surface to inertia ratio, and said material characterized as stiff and brittle and having the ability to resist deformation when oscillated at the natural frequency of said suspension means.

2. A galvanometer for providing an indication of an input signal as claimed in claim 1 wherein said reflective means is formed with a thickness of less than .001 inch and a flatness of better than 10 microinches across the width thereof.

3. A galvanometer for providing an indication of an input signal as claimed in claim 1, further characterized by said reflective means material being capable of providing a mirror surface without further treatment thereof.

4. A galvanometer for providing an indication of an input signal as claimed in claim 1 additionally comprising a first coating means deposited upon said reflective means for increasing the reflectivity thereof.

5. A galvanometer for providing an indication of an input signal as claimed in claim 4 additionally comprising a second coating means deposited upon said first coating means for protection thereof.

6. A galvanometer for providing an indication of an input signal as claimed in claim 1, wherein said element material forming said reflective means is germanium.

7. A galvanometer for providing an indication of an input signal as claimed in claim 1, wherein said element material forming said reflective means is silicon.

8. A galvanometer for providing an indication of an input signal as claimed in claim 4, further characterized by said first coating means being aluminum.

9. A galvanometer for providing an indication of an input signal as claimed in claim 5, further characterized by said second coating means being silicon monoxide.

10. A galvanometer for providing a reflected light beam as an indication of an input signal applied to a signal coil means which is suspended by coil suspension means therein, comprising, reflective means constructed from the crystal material of an element and having a surface flatness of better than 10 microinches and a thickness of less than .001 inch, said element material having a crystal lattice of the cubic diamond form for providing said reflective means with a large reflective surface area to inertia ratio.

11. A galvanometer as claimed in claim 10 additionally comprising, said reflective means having a first layer of aluminum upon said surface for increasing the reflectivity thereof, and a second layer of silicon monoxide upon said first layer for protection thereof.

12. A galvanometer as claimed in claim 10 additionally comprising, a first amount of bonding resin for holding said reflective means to said coil suspension means, and a second amount of bonding resin upon said surface of said reflective means opposite said first amount of bonding resin for preventing stress within said reflective means.

References Cited

UNITED STATES PATENTS

| | | | |
|---|---|---|---|
| 2,463,792 | 3/1949 | Morgan | 117—35 |
| 2,519,591 | 8/1950 | Morrow | 324—154 X |
| 2,578,956 | 12/1951 | Weinrich | 117—35 |
| 2,846,650 | 8/1958 | Rich | 324—97 |
| 2,907,672 | 10/1959 | Irland et al. | 117—35 |
| 3,245,083 | 4/1966 | Wilson et al. | 324—97 X |

ALFRED E. SMITH, Primary Examiner